E. OBRECHT.
TRANSMISSION GEAR FOR AUTOMOBILES.
APPLICATION FILED AUG. 11, 1917.

1,246,779.

Patented Nov. 13, 1917.

Inventor:
Edward Obrecht,
by Eugene C. Brown
Atty.

UNITED STATES PATENT OFFICE.

EDWARD OBRECHT, OF LOUISVILLE, KENTUCKY.

TRANSMISSION-GEAR FOR AUTOMOBILES.

1,246,779.  Specification of Letters Patent.  Patented Nov. 13, 1917.

Application filed August 11, 1917. Serial No. 185,714.

*To all whom it may concern:*

Be it known that I, EDWARD OBRECHT, a citizen of the United States, residing at Louisville, in the county of Jefferson and State of Kentucky, have invented certain new and useful Improvements in Transmission-Gear for Automobiles, of which the following is a specification.

My invention relates to the class of transmission gearing which involves changeable or variable speeds, and is especially applicable to automobiles.

The general object of my invention is to simplify the mechanism, both in construction and operation by providing a single clutch band which may be shifted to engage any one of the several speed wheels so that the control of all speeds forward and reverse is effected by a single lever. I further provide improved speed or clutch wheels and clutching mechanism.

Figure 1:
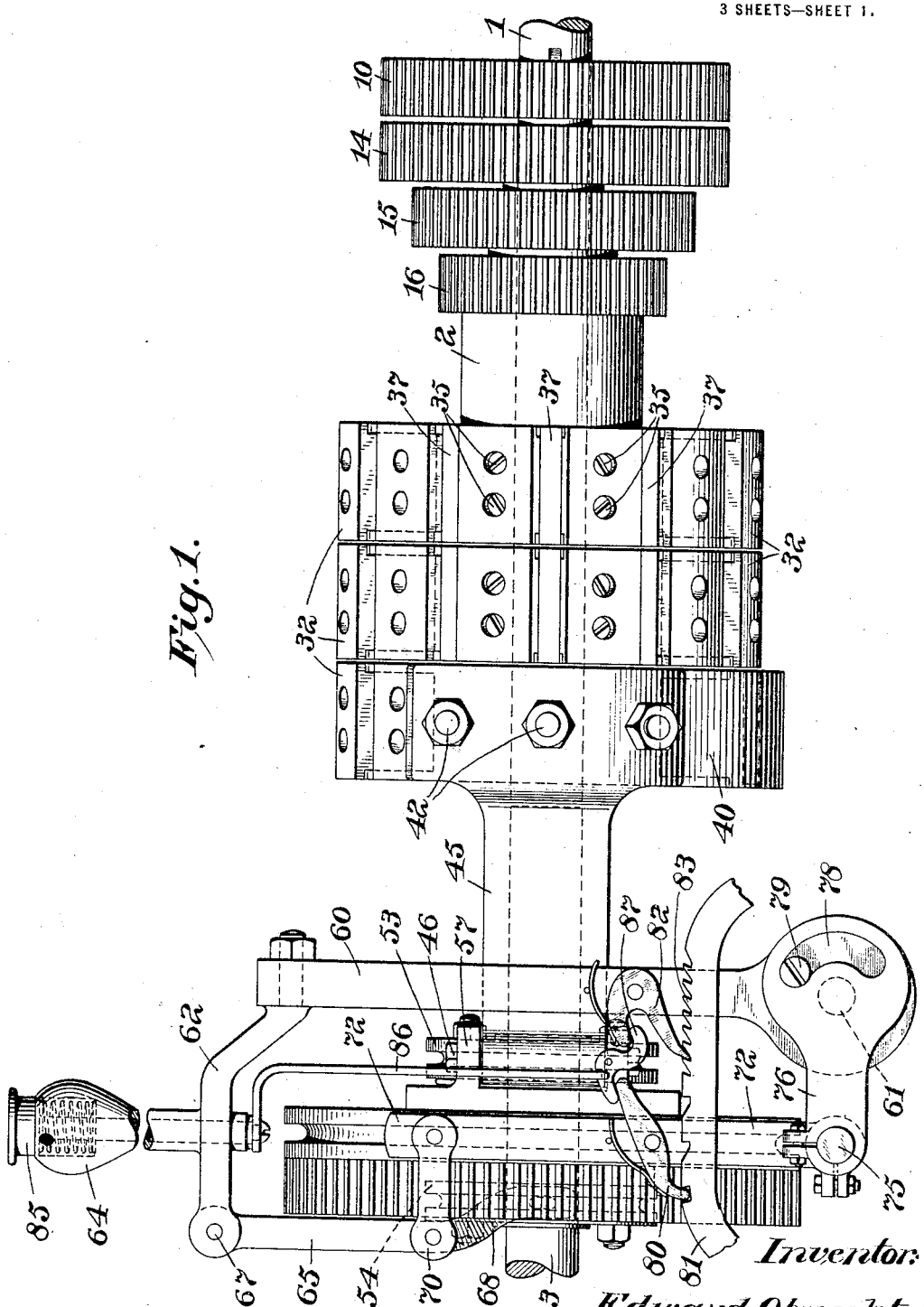
Figure 2:
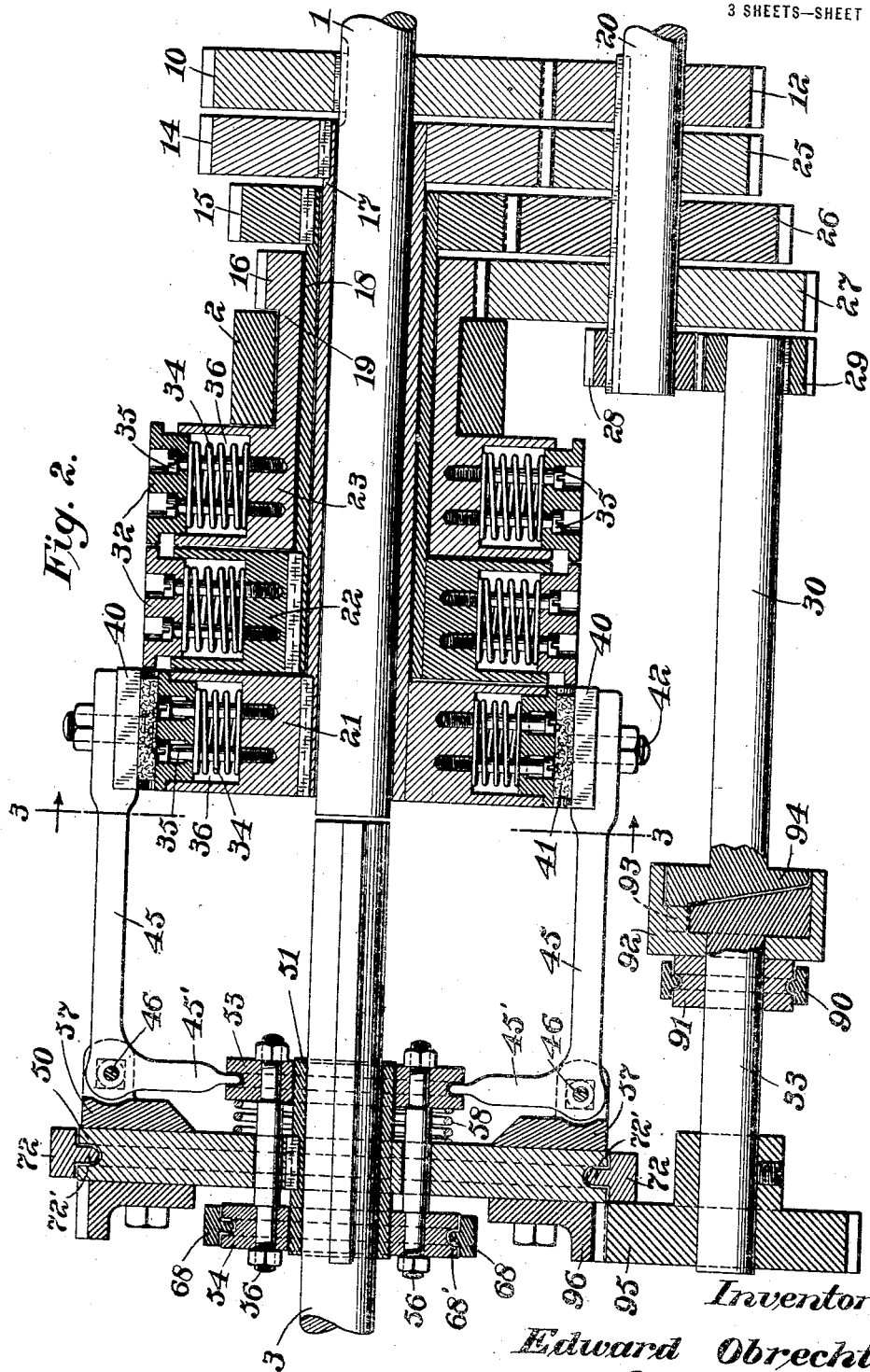
Figure 3:
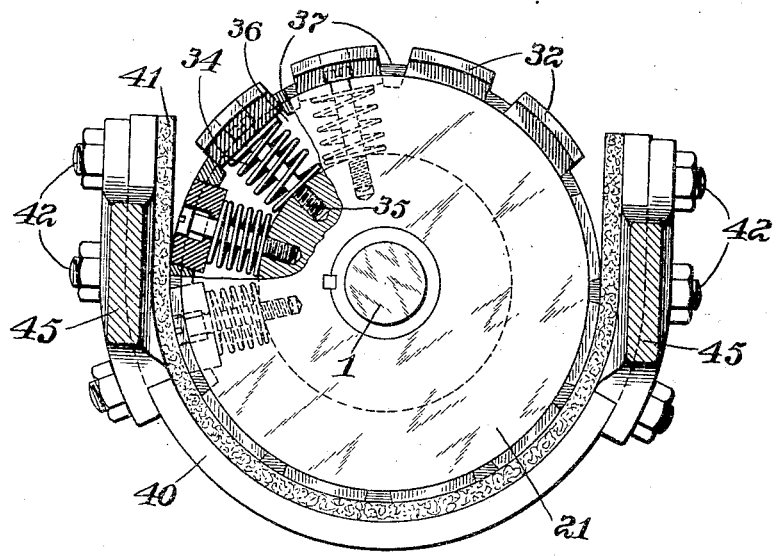
Figure 4:
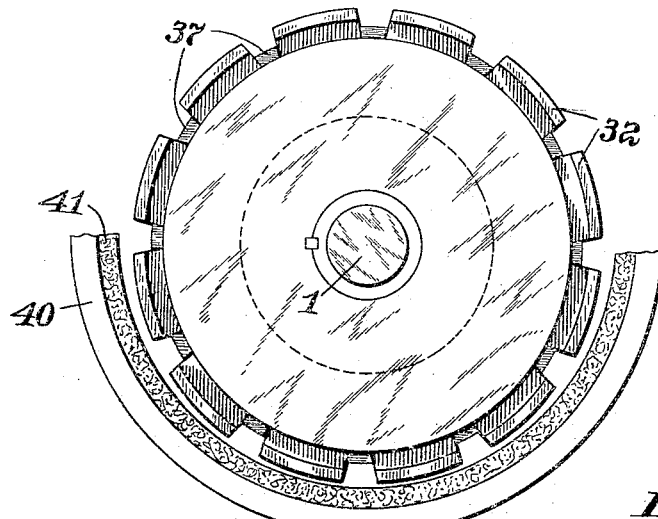

In the accompanying drawings, Figure 1 is a side elevation of a transmission gearing embodying my invention; Fig. 2 is a longitudinal horizontal section of the same taken at right angles to Fig. 1; Fig. 3 is a vertical sectional view on the line 3—3 of Fig. 2; and Fig. 4 is a front elevation of one of the clutch pulleys, and a partial view of the clutch band.

The driving shaft 1 connected to the engine or motor, is suitably supported in bearings on the main frame of the machine, one of which is indicated at 2, and is in alinement with the driven shaft 3. The driving gear 10 is keyed to the shaft 1 and is in mesh with the pinion 12, keyed to the counter-shaft 20. The speed gears 14, 15 and 16 are keyed respectively to sleeves 17, 18 and 19 which carry at their opposite ends the speed wheels or clutch-pulleys 21, 22 and 23, the inner sleeve 17 being revoluble upon the shaft and the other sleeves being revoluble upon each other. Suitable roller or ball bearings may be interposed as desired. The speed gears are in mesh with corresponding pinions 25, 26 and 27 splined to the counter-shaft. The pinion 28 is in mesh with the gear 29 on the reversing shaft 30.

The clutch pulleys are provided with equally spaced friction plates 32, which are yieldingly supported upon springs 34 and guided upon bolts 35 within recesses or pockets 36 in the pulleys, the margins or flanges of the plates projecting over the edges of the recesses in order that they may bear thereon when they are engaged and forced inwardly by the clutch band. Intermediate the plates are cross bars 37, which engage the clutch band as the plates are forced inwardly against the rims of the pulleys. The face of the plates and of the cross-bars may be rough cast to increase the frictional contact or grip upon the band.

The clutch band preferably consists of a steel band 40, having an inner lining 41, of a suitable fabric or material, secured to the band by means of flat-headed screws or rivets, or in any other suitable manner. The band is secured by bolts 42, to the arms 45 of bell-crank levers pivoted at 46. The band is somewhat longer than the semi-circumference of the pulleys, so that when the arms 45 are moved toward each other the bands are caused to tightly clutch the pulley, forcing the plates against the rim, as indicated in Fig. 3, and when the arms 45 are moved outwardly the band will be freed from the pulley in the manner shown in Fig. 4.

The control mechanism is shown at the left of Figs. 1 and 2. The grooved disk 50 is keyed to a sleeve 51 which is splined to the driven shaft 3, so that while continuously in driving relation therewith, it may be slid longitudinally thereon. The grooved collars 53, 54, loosely mounted upon the sleeve 51, are rigidly united by bolts 56, which are slidable through holes in the disk. The shorter arms 45' of the bell-crank levers attached to the clutch band are pivoted to ears 57 carried by the disk 50, and engage the groove in the collar 53. The spring 58 normally forces the collars toward the clutch pulleys, thereby throwing the arms 45 outwardly to release the clutch band from the pulleys. The operating or control lever 60 is pivoted at 61 to a stationary member of the chassis and is connected by means of the rod 62 with an operating handle 64. The lever 65 is pivoted at 67 to the rod 62 at one end and at its opposite end is formed into a yoke, arms 68 of which are provided with pins 68' to engage the groove in the collar 54. The link 70 connects the lever 65 with a yoke lever 72 provided with pins 72' which engage the groove in the disk 50, the lever 72 being pivotally secured to the pivot rod 75 carried by a cam strap 76 which is provided with a cam slot 78 to engage a pin or screw 79 on the boss of the lever 60.

The operation will be understood from the above detailed description of the separate parts. A spring-pressed latch 80 is adapted to engage one or the other of the three notches in the stationary segment 81 to lock the disk 50 in one of the positions corresponding with a clutch disk 21, 22 or 23 and a spring-pressed dog 82 engages the teeth 83 on the rack to hold the lever 60 after it has been rocked on the pivot 61 to cause the arms 45 to tighten the clutch band 40 against the clutch pulley. In Figs. 1 and 2 parts are shown in position for the lowest speed. If it is desired to change to one of the higher speeds, the spring-pressed button 85 in the top of the controller handle 64 is pressed downwardly to cause the rod 86 to rock the releasing catch 87 to lift the dog 82 and the latch 80 from the notches in the segment 81, whereupon the spring 58 acting through the collar 53 and levers 45 releases the clutch band from the clutch pulley 21 so that the parts are free to be moved as desired. The controller handle 64 can then be moved forwardly to bring the clutch band over either one of the clutch pulleys 22, 23, depending upon the desired speed, after which the latch 80 will engage one of the notches to thereby lock the yoke lever 72 and the disk 50 in a new position. As the lever 60 is swung upon its pivot 61, the screw 79 engages the cam slot 78 and thereby moves the cam plate 76 which carries the pivot rod 75 and thus slides the lever 72 and the disk 50 connected therewith in one direction or the other longitudinally of the splined shaft 3. Further forward pressure upon the controlling handle will cause the lever 60 to rock upon its pivot 61 still further and this movement will exert a pull upon the lever 65 through the pivot 67, which will fulcrum upon the link 70 and cause the arm 68 to move the collars 54 and 53 toward the left, in opposition to the spring 58, thereby causing the arms 45 of the ball-crank levers to move inwardly, forcing the clutch band into engagement with the adjacent clutch pulley. Power will then be transmitted from the engine shaft 1 through the gear 10 and pinion 12 to the countershaft 20 and thence through one of the pinions 26 or 27 and the corresponding speed gear 15 or 16, through the pulley 22 or 23 and the clutch band to the arms 45 which are secured to the disk 50, the latter being splined to the driven shaft 3.

In case it is desired to drive the shaft 3 in the reverse direction, the clutch band is first released by pressing upon the button 85 to lift the dog 82 from the rack teeth 83 so as to permit the spring 58 to retract the collars 53 to which the bell crank lever 45 is connected. The yoke 90 connected with any suitable hand or foot lever is then operated to move the collar 91 and clutch box 92 so that the recess in the latter will engage with the clutch pin or teeth 93 in the clutch member 94 to thereby connect the shaft 30 with the shaft 33 which carries the pinion 95 meshing with the gear teeth on the flange 96 which is bolted to the disk 50. Power will then be transmitted from the engine shaft 1 through the gear 10 and pinion 12 to the counter shaft 20 and through the pinion 28 and gear 29 to the shaft 30 which is now connected through the clutch parts 92, 94 with the shaft 33, the latter being connected with the driven shaft through the gears 95 and 96. The advantages of my transmission mechanism will be apparent to engineers who are familiar with the requirements of variable speed gearing and especially to those familiar with the particular requirements of transmission gear for automobiles. I am enabled to control all of the forward speeds and to change from one speed to either of the other speeds by manipulating a single controlling handle. I have eliminated the wear and danger of stripping the teeth which are liable to occur when the gears are shifted from one to another and for greatly simplifying the construction by employing a single clutch band which is shifted for engagement with any desired clutch pulley corresponding to the chosen speed. I have also eliminated shocks and sudden jars when changing from one speed to another by providing the clutch pulleys with yieldable peripheral members which gradually increase their resistance and frictional engagement as the clutch band is tightened. The engagement between the clutch band and the pulleys is, therefore, gradual during engagement or disengagement, while the pressure of the compressed springs 34 increases the gripping engagement to thereby resist any tendency to slippage when the clutch band is engaged.

I have described in detail the particular construction illustrated in the accompanying drawings for the purpose of clearly disclosing an embodiment of my invention but it will be understood that various changes and modifications may be made within the scope of my claims and without departing from my invention.

I claim:—

1. In variable-speed transmission gearing, the combination of a driving shaft, a driven shaft, coaxial therewith, clutch elements mounted on the driving shaft and having sleeve portions, gearing connections between said sleeve portions and the driving shaft, a disk slidably mounted upon the driven shaft, a clutch band carried by said disk and adapted to surround any one of said clutch elements, and means for sliding said disk to bring said band over the desired element and clamping said band in frictional engagement therewith.

2. In a variable-speed transmission gearing, the combination of a driving shaft, a driven shaft coaxial therewith, clutch elements mounted on the driving shaft and having sleeve portions, gearing connections between said sleeve portions and the driving shaft, a disk slidably mounted upon the driven shaft, lever arms pivotally secured to said disk, a clutch band carried by said arms and adapted to surround any one of said clutch elements, and means for sliding said disk to bring said band over the desired element and for actuating said lever arms to clamp said band in frictional engagement with said element.

3. In a variable-speed transmission gearing, the combination of a driving shaft, a driven shaft coaxial therewith, clutch elements mounted on the driving shaft and having sleeve portions, gearing connections between said sleeve portions and the driving shaft, a disk slidably mounted upon the driven shaft, lever arms pivotally secured to said disk, a clutch band carried by said arms and adapted to surround any one of said clutch elements, a collar movably secured to said disk and normally spring-pressed therefrom, said arms being operatively connected to said collar, and means for sliding said disk to bring said band over the desired clutch element and for moving said collar to thereby bring the band into frictional engagement with said element.

4. In a variable-speed transmission gearing, the combination of a driving shaft, a driven shaft coaxial therewith, clutch elements mounted on the driving shaft and having sleeve portions, gearing connections between said sleeve portions and the driving shaft, a disk slidably mounted upon the driven shaft, lever arms pivotally secured to said disk, a clutch band carried by said arms and adapted to surround any one of said clutch elements, a collar movably secured to said disk and normally spring-pressed therefrom, said arms being operatively connected to said collar, and a pivotally mounted controlling lever operatively connected to said disk and to said collar, whereby the initial movement of the lever moves the band over the desired clutch element and a further movement thereof causes the band to frictionally engage the element.

5. In a transmission gearing, the combination of a driving shaft, a driven shaft in alinement therewith, clutch elements mounted on the driving shaft, a disk slidably mounted upon the driven shaft and a clutch band carried by said disk and adapted to surround any one of said clutch elements and be clamped thereto, each clutch element comprising a pulley or disk having a recessed periphery, and friction plates mounted for radial movement in said recesses and normally spring-pressed radially beyond the periphery of the disk.

6. In a transmission gearing, the combination of a driving shaft, a driven shaft in alinement therewith, clutch elements mounted on the driving shaft, a disk slidably mounted upon the driven shaft and a clutch band carried by said disk and adapted to surround any one of said clutch elements and be clamped thereto, each clutch element comprising a pulley or disk having a recessed periphery, friction plates mounted for radial movement in said recesses and normally spring-pressed radially beyond the periphery of the disk, and cross-bars secured to the periphery intermediate said plates.

In testimony whereof I affix my signature.

EDWARD OBRECHT.

Copies of this patent may be obtained for five cents each, by addressing the "Commissioner of Patents, Washington, D. C."